(12) United States Patent
Iwata et al.

(10) Patent No.: US 7,104,781 B2
(45) Date of Patent: Sep. 12, 2006

(54) INJECTION MOLDING APPARATUS AND INJECTION MOLDING METHOD

(75) Inventors: Yukio Iwata, Toyota (JP); Yoshiharu Isoshima, Okazaki (JP)

(73) Assignee: Toyota Jidosha Kabushiki Kaisha, (JP)

( * ) Notice: Subject to any disclaimer, the term of this patent is extended or adjusted under 35 U.S.C. 154(b) by 0 days.

(21) Appl. No.: 10/936,768

(22) Filed: Sep. 9, 2004

(65) Prior Publication Data

US 2005/0053688 A1 Mar. 10, 2005

(30) Foreign Application Priority Data

Sep. 10, 2003 (JP) ............................. 2003-318789

(51) Int. Cl.
*B29B 11/06* (2006.01)
(52) U.S. Cl. .................. 425/542; 425/450.1; 425/412; 425/441; 425/542; 425/405.1; 425/DIG. 53; 425/DIG. 243; 425/DIG. 247
(58) Field of Classification Search ............ 425/450.1, 425/412, 441, 542, 405.1, DIG. 53, DIG. 243, 425/DIG. 247
See application file for complete search history.

(56) References Cited

U.S. PATENT DOCUMENTS

| | | | |
|---|---|---|---|
| 5,252,269 A * | 10/1993 | Hara et al. .................. 264/45.3 |
| 5,281,376 A * | 1/1994 | Hara et al. .................. 264/46.4 |
| 5,700,415 A * | 12/1997 | Hiroki et al. ................ 264/318 |
| 5,980,809 A * | 11/1999 | Crain et al. .................. 264/318 |
| 6,416,315 B1 * | 7/2002 | Ciccone ....................... 425/556 |

FOREIGN PATENT DOCUMENTS

| JP | B-6-28886 | 4/1994 |
|---|---|---|
| JP | B-6-67582 | 8/1994 |

* cited by examiner

*Primary Examiner*—Robert Davis
*Assistant Examiner*—G. Nagesh Rao
(74) *Attorney, Agent, or Firm*—Finnegan, Henderson, Farabow, Garrett & Dunner, LLP

(57) ABSTRACT

An injection molding apparatus has a die having a fixed mold and a moveable mold disposed to face with each other. A frame structure is detachably provided on the outer surfaces of the fixed mold and the moveable mold, that is, opposite to the surface of the cavity defined by the fixed mold and the moveable mold. Each frame that constitutes the frame structure has a shape that can be combined together. One of frames provided on the fixed mold or the moveable mold is fixed thereto in a die clamping direction or a direction perpendicular thereto. The frame is fixed to the fixed mold of the die, leaving a predetermined gap in the direction perpendicular to that for fixing the frame structure to the die. The pressurizing mechanism that applies a pressing force in the direction other than for fixing the frame structure to the die. The hydraulic control mechanism is employed as the pressurizing mechanism.

8 Claims, 10 Drawing Sheets

INJECTION MOLDING APPARATUS AND INJECTION MOLDING METHOD

INCORPORATION BY REFERENCE

The disclosure of Japanese Patent Application No. 2003-318789 filed on Sep. 10, 2003, including its specification, drawings and abstract, is incorporated herein by reference in its entirety.

BACKGROUND OF THE INVENTION

1. Field of the Invention

The invention relates to an injection molding technique for injecting a resin material into a cavity to form an injection molded product. More particularly, the invention relates to a technique that pressurizes a die so as to restrain generation of burr in the molded product formed through the injection molding method.

2. Description of Related Art

A generally employed injection molding apparatus is provided with a clamp mechanism including a hydraulic stuffer or a toggle mechanism for the purpose of maintaining the resin pressure within the cavity constant and restraining deformation of the die. The clamp mechanism serves to clamp a fixed mold and a moveable mold.

There is a known mechanism disclosed in Japanese Patent Publication No. JP-B-6-67582, which pressurizes a die in the direction perpendicular to a die clamping direction in conjunction with a die clamp mechanism so as to restrain deformation of the die caused under the resin pressure without requiring enhancement of rigidity of the die and forming a molded product with high accuracy through an injection molding method at a low cost.

There is also a known apparatus disclosed in Japanese Patent Publication No. JP-B-6-28886, which employs a hydraulic cylinder as the mechanism that pressurizes a die in the direction perpendicular to a die clamping direction.

The generally employed mechanism that pressurizes the die in the direction perpendicular to the die clamping direction requires a pressing unit to be provided for the injection molding apparatus, resulting in increase in both the cost and the system size. The aforementioned mechanism fails to completely prevent generation of burr in the injection molded product.

The technique disclosed in Japanese Patent Publication No. JP-B-6-67582 cannot be realized by a simple structure, and it is difficult to control the pressing force applied to the die in the direction perpendicular to the die clamping direction in accordance with the resin pressure.

The technique disclosed in Japanese Patent Publication No. JP-B-6-28886 may increase the size of the system and elongate the time required for the molding method. Accordingly the control of the injection molding apparatus becomes complicated.

SUMMARY OF THE INVENTION

In the invention, a frame structure may be detachably attached to the die on each of the respective outer surfaces of the fixed mold and the moveable mold of the injection molding apparatus. The frame structure is provided with a pressurizing mechanism, and includes frames that can be combined so as to be attached to the die. The die is pressurized by the frame structure such that generation of burr in the injection molded product may be restrained.

At least one of members that constitute the frame structure fit with the fixed mold or the moveable mold is fixed to either the fixed mold or the moveable mold, leaving a gap in the direction perpendicular to the die clamping direction.

The pressurizing mechanism is provided such that the pressing force is applied either in the die clamping direction or the direction perpendicular thereto, that is, the direction in which the member that constitutes the frame is not fixed. Accordingly the pressing force is applied to the die in the direction perpendicular to the direction for fixing the member that constitutes the frame.

The pressurizing mechanism is controlled in accordance with the amount of the resin injected into the cavity of the die.

According to the first aspect of the invention, an injection molding apparatus includes a die having a fixed mold and a moveable mold disposed to face with each other, and a frame structure that abuts on an outer surface of the die. In the injection molding apparatus, the frame structure is formed so as to be detachable with respect to the die, and the frame structure is formed by combining members each engaged with each other, and the members that form the frame structure are fixed to the die in at least one direction of a die clamping direction and a direction perpendicular thereto.

In a first aspect of the invention, rigidity of the die may be enhanced and the pressurizing mechanism is structured so as to be applicable to various types of die while being simply structured.

A predetermined gap may be formed between the member that forms the frame structure to be fixed to the die and a fixture in a direction perpendicular to a direction where the frame structure is fixed to the die. The invention is allowed to cope with deformation of the frame caused by the pressing force applied to the die. The deformation of the frame may be used to smoothly control the pressing force.

The frame structure may be provided with a pressurizing mechanism capable of pressing the die in a direction perpendicular to the direction where the frame structure is fixed to the die. In the invention, the deformation of the frame may be used to control the pressing force as well as prevent the die from being applied with the excessive pressing force.

The pressurizing mechanism may be formed as a hydraulic control mechanism. This makes it possible to simplify the structure of the pressurizing mechanism while generating a great magnitude of the pressing force.

The hydraulic control mechanism executes a control of a pressing force in accordance with an amount of a resin material injected into the die. This makes it possible to maintain the balance of the force applied to the inside and the outside of the die, thus reducing the load exerted thereto.

A resin pressure generated in the die of the injection molding apparatus may be partially received by the frame structure fit with the die. This makes it possible to reduce the load exerted to the die and enhance durability thereof. The rigidity of the die may further be enhanced during the injection molding method with the simplified structure.

A frame structure may be provided outside of a die having a fixed mold and a moveable mold disposed to face with each other, and a restoring force caused by an elastic deformation of the frame structure may function in resisting a resin pressure generated within the die. As a result, the resin pressure can be smoothly absorbed so as to easily cope with fluctuation in the resin pressure.

A frame structure may be provided outside of a die having a fixed mold and a moveable mold disposed to face with each other, and a pressurizing mechanism provided on the frame structure may serve to pressurize the die in a direction perpendicular to a die clamping direction so as to restrain deformation of a joint portion between the fixed mold and the moveable mold of the die caused under a resin pressure. This makes it possible to reduce generation of burr during the injection molding method so as to produce the molded product with higher molding accuracy.

The invention makes it possible to reduce deformation of the die caused under the resin pressure, and to restrain generation of burr. As the pressing force is applied to the die from outside thereof in the die clamping direction and the direction perpendicular thereto, deformation of the die caused under the resin pressure may be restrained, thus restraining generation of burr.

The thus simply structured apparatus according to the invention may allow deformation in the die during the injection molding method to be restrained, as well as generation of burr in the injection molded product to be restrained.

DETAILED DESCRIPTION OF THE PREFERRED EMBODIMENTS

Figure 1:
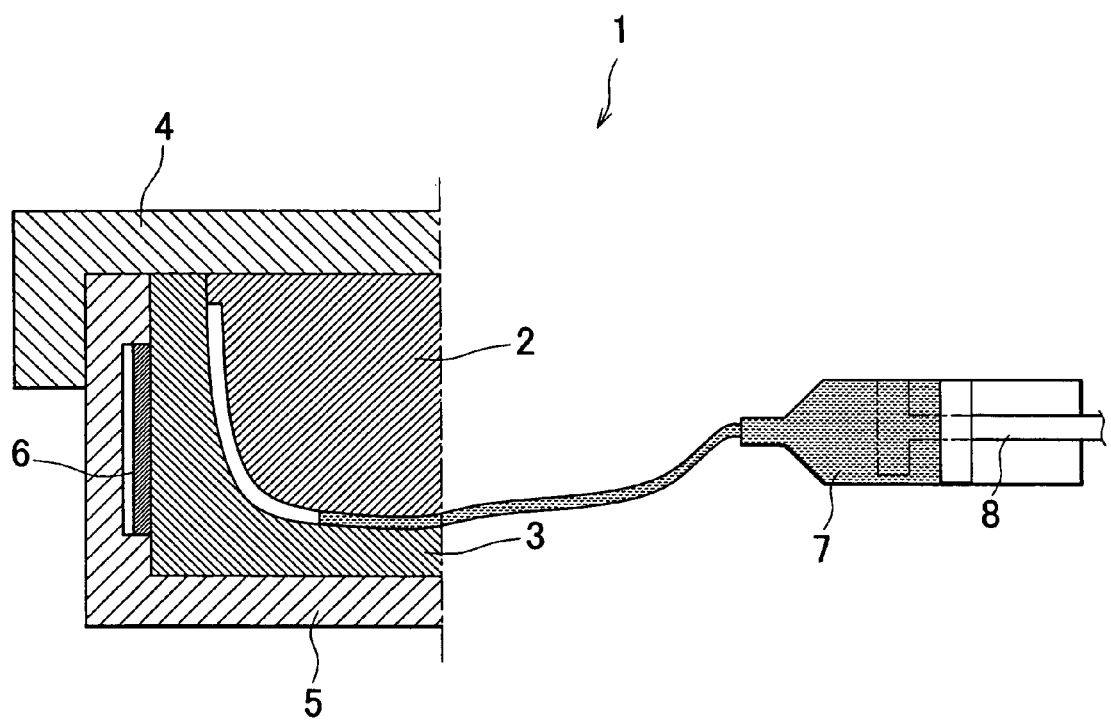
FIG. 1 is a schematic view showing a structure of an injection molding apparatus.

FIG. 1 shows a structure of an injection molding apparatus of the invention.

In an injection molding apparatus 1, a resin material is forced out of a cylinder 7 through a sliding operation of a plunger 8 so as to be supplied to a portion between a moveable mold 2 and a fixed mold 3 such that the resin material is molded. In the injection molding apparatus 1, a cavity is defined by the moveable mold 2 and the fixed mold 3, and connected to the cylinder 7 via a gate and the like. The resin material is introduced into the cavity by the amount corresponding to an injection stroke of the plunger 8.

The moveable mold 2 and the fixed mold 3 are clamped, the respective outer surfaces of which are fit with a frame structure including two frames 4 and 5. The frames 4 and 5 are assembled to surround the moveable mold 2 and the fixed mold 3 and to be fit with the die.

The frame 5 includes a pressurizing mechanism 6 so as to pressurize the die fit with the frames 4 and 5. The pressurizing mechanism 6 serves to apply a pressing force to an outer side surface of the fixed mold 3 in the direction perpendicular to the die clamping direction, that is, the direction for clamping the moveable mold 2 and the fixed mold 3.

The pressing force applied to the die is controlled in accordance with the amount of the resin injected into the die. The pressing force is coincided with the amount of the injected resin so as to prevent application of the pressure intensively to the joint portion when the resin pressure is not exerted to the die during its operation, thus protecting the joint portion of the die.

The configuration of the moveable mold 2, the fixed mold 3, and the frames 4 and 5 will be described.

Figure 2:
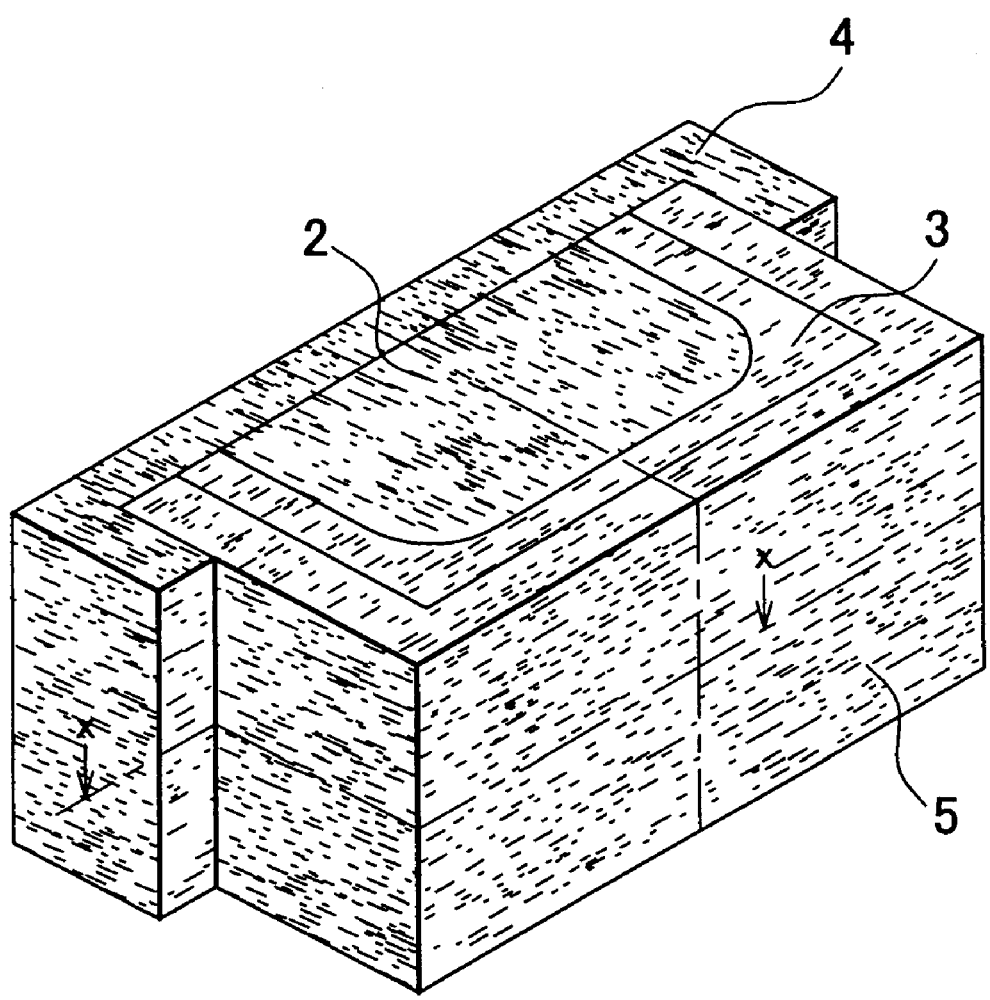
FIG. 2 is a perspective view showing a structure of a die to which a frame structure is fit.
Figure 3:
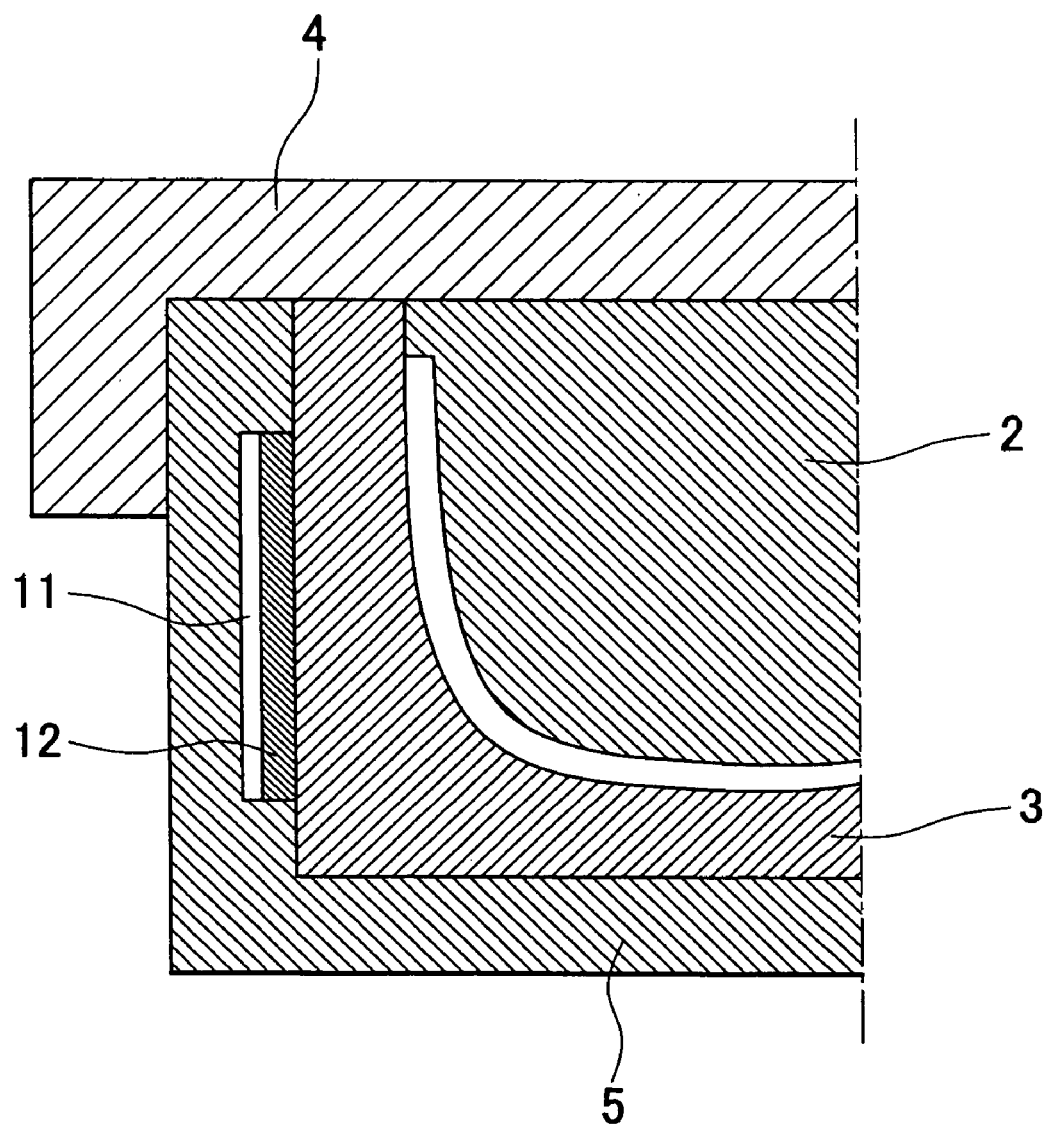
FIG. 3 is a sectional view taken along line X—X of FIG. 2, representing a structure of a pressurizing mechanism.

FIG. 2 is a perspective view showing the die with which the frame structure is fit. FIG. 3 is a view taken along line X—X of FIG. 2, showing a configuration of the pressurizing mechanism.

The frames 4 and 5 are fit with the clamped body of the moveable mold 2 and the fixed mold 3. The pressure exerted to the moveable mold 2 and the fixed mold 3 upon injection of the resin is received by the frames 4 and 5 so as to improve the molding accuracy in the injection molded product without the need of enhancing rigidity of the moveable mold 2 and the fixed mold 3. Accordingly each cost for producing the moveable mold 2 and the fixed mold 3 may be reduced.

The framers 4 and 5 serve to receive the force generated upon the injection molding in a die clamping direction and a direction perpendicular thereto, respectively. The frame 5 is formed into a substantially U-shaped and structured to be fit with a plane perpendicular to and in parallel with the die clamping direction with respect to the fixed mold 3. The frame 4 serves to receive an assembled body of the moveable mold 2, the fixed mold 3 and the frame 5 in its recess portion. That is, each inner end surface of the frame 4 abuts on each outer end surface of the frame 5.

The frames 4 and 5 are engaged in the die clamping direction and the direction perpendicular thereto, thus receiving the force generated upon injection molding in the die clamping direction and the direction perpendicular thereto. Both ends of the frame 4 serve to restrict outward expansion of the respective ends of the frame 5, thus enhancing rigidity of the frames 4 and 5.

Referring to FIG. 3, the frame 5 includes a structure as the a pressurizing mechanism that presses a plate under the hydraulic pressure. The pressurizing mechanism that includes an oil chamber 11 and a pressurizing plate 12 formed on the frame 5 is provided to face the surface of the fixed mold 3 in parallel with the die clamping direction. The pressurizing plate 12 is disposed within the oil chamber 11 so as to be slidably moved along the inner surface of the oil chamber 11. Upon supply of the work oil into the oil chamber 11, the pressurizing plate 12 slides inward to pressurize the fixed mold 3.

Figure 4:
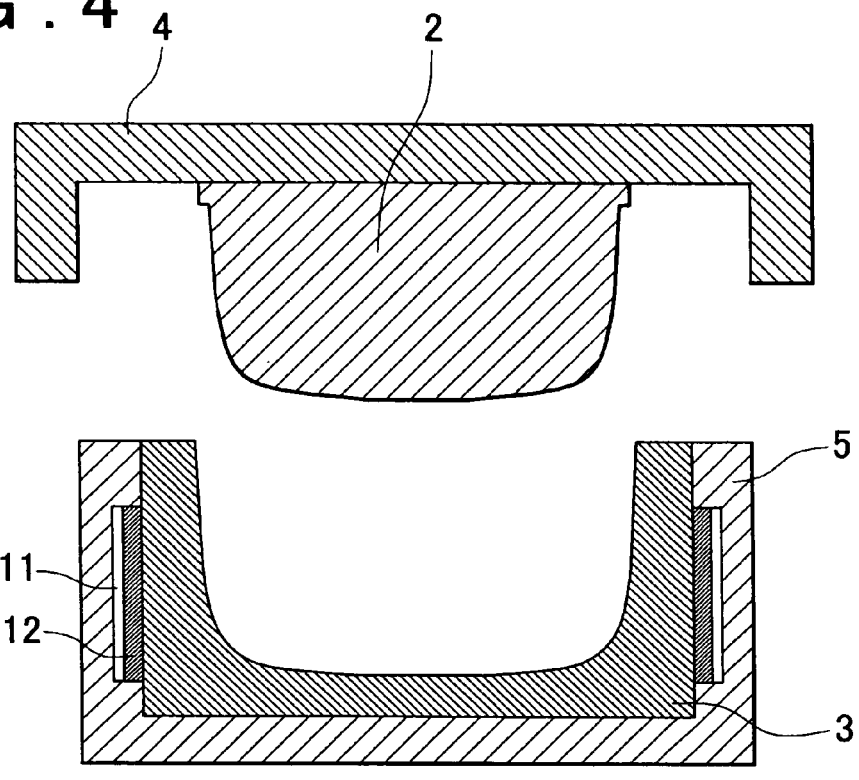
FIG. 4 is a view representing an assembled structure of the frame structure and the die.
Figure 4:
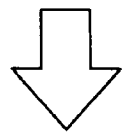
Figure 4:
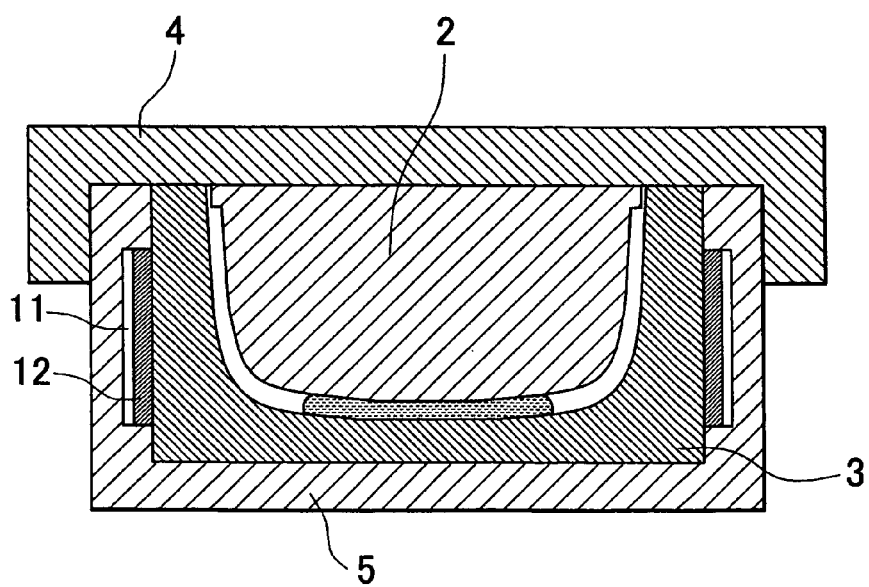

FIG. 4 is a view representing an assembled structure of the frame structure and the molds.

The frame 4 is fixed to the moveable mold 2, and the fixed mold 3 is fixed to the frame 5. The die is formed by joining the moveable mold 2 and the fixed mold 3 in the die clamping direction, and accordingly the frames 4 and 5 are combined.

As the moveable mold 2 is fixed to the frame 4, and the fixed mold 3 is fixed to the frame 5, the die may be formed simultaneously with the combination of the frames 4 and 5.

After joining the fixed mold 3 and the moveable mold 2, the resin is injected into the cavity defined by the fixed mold 3 and the moveable mold 2. As shown in FIG. 4, the resin is injected to the center of the cavity such that the resin spreads toward portions in the cavity at both sides closer to the respective pressurizing mechanism.

The control mechanism of pressurizing operation will be described hereinafter.

Figure 5:
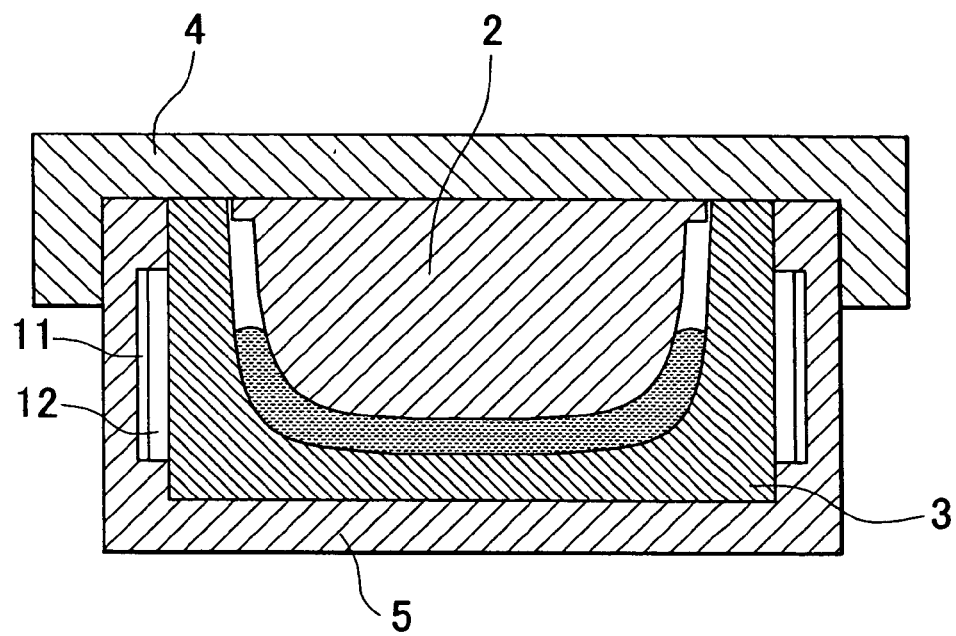
FIG. 5 is a view representing a configuration formed of the die and the frame structure upon start of pressurization.
Figure 6:
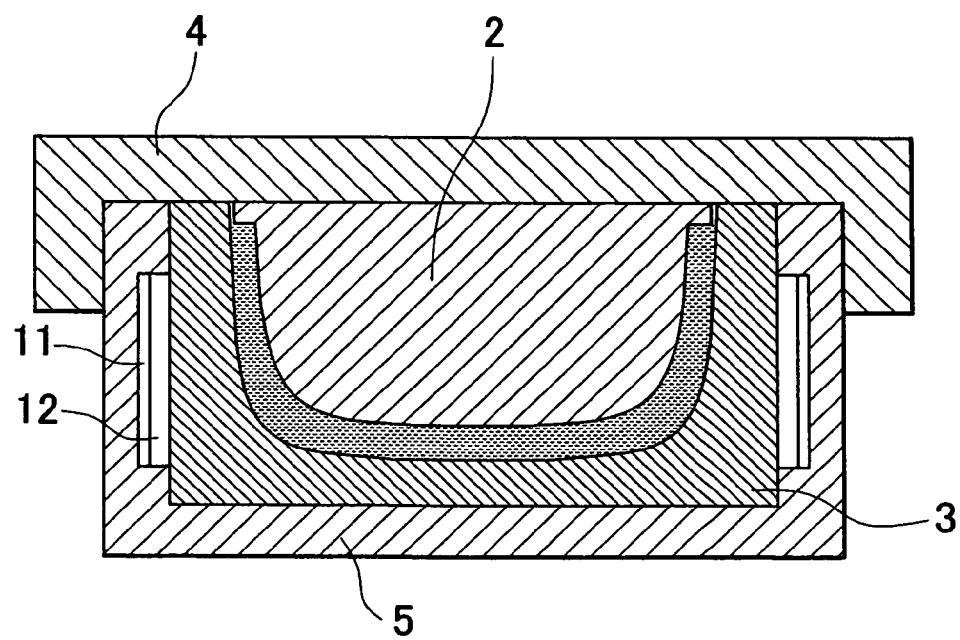
FIG. 6 is a view representing a configuration formed of the die and the frame structure under the pressurized state.
Figure 7:
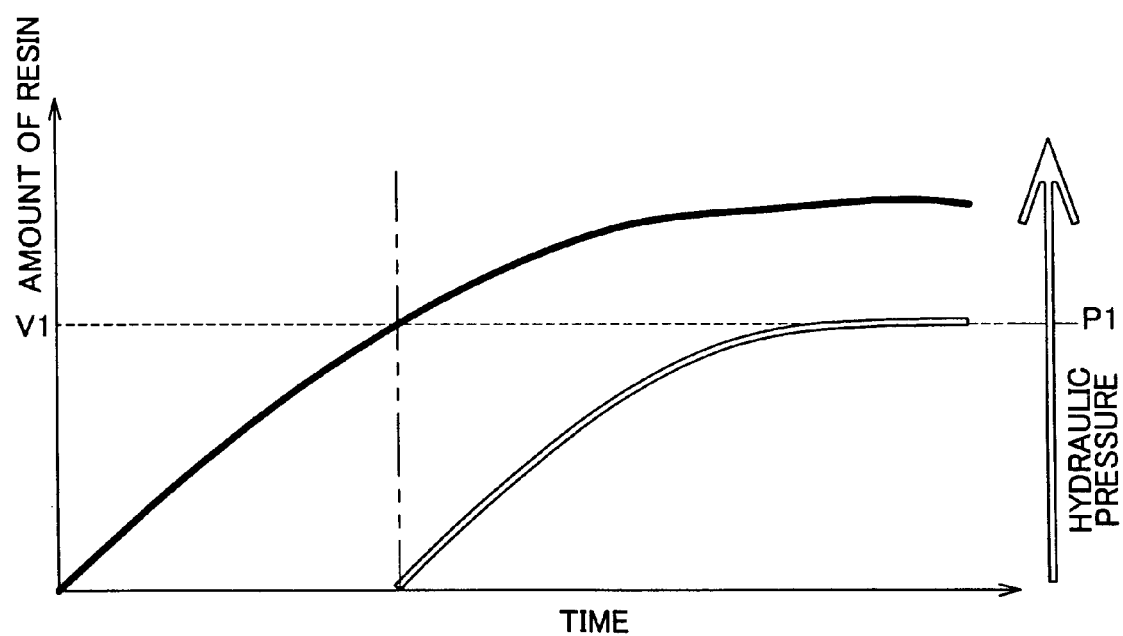
FIG. 7 is a graph representing a relationship between the resin amount and an amount of work oil supplied to the oil chamber.

FIG. 5 is a view representing the configuration of the die and the frame structure upon start of pressurization. FIG. 6 is a view representing the configuration of the die and the frame structure under the pressurization. FIG. 7 is a graph showing a relationship between the amount of the resin material and the amount of oil supplied to the oil chamber. Referring to FIG. 7, the bold line stands for the change in the amount of the resin injected into the die with respect to time, and a double line stands for the pressure applied by the pressurizing mechanism with respect to time.

Referring FIG. 5, when the amount of the resin material injected into the die reaches a predetermined value, the supply of the work oil to the oil chamber 11 of the frame 5 starts. Then the pressure within the oil chamber 11 rises to increase the pressing force applied by the pressurizing plate 12. As shown in FIG. 6, in the state where the cavity of the die is substantially fully filled with the injected resin material, the pressure within the oil chamber 11 becomes constant, thus making the pressing force constant.

As the pressing force is applied in accordance with the pressure of the resin injected into the cavity, the die becomes unlikely to deform in the process of injection molding.

The pressing force is controlled in accordance with the amount of the injected resin material as shown in FIG. 7.

When the amount of the resin injected into the die reaches a constant value or greater, the hydraulic pressure to the oil chamber 11 rises. The pressure exerted to the oil chamber 11 is to be maintained after reaching the set value. The set pressure may be the same as the pressure of the injected resin. Accordingly this makes it possible to restrain deformation in the fixed mold 3, resulting in improved molding accuracy.

Referring to the graph shown in FIG. 7, when the amount of the resin injected into the die reaches the set value V1, the pressure of the pressurizing mechanism starts rising. The hydraulic pressure of the pressurizing mechanism is set to maintain the value P1. Once the pressure reaches the value P1, the hydraulic pressure serves to maintain the value P1.

The stroke of the plunger 8 for injecting the resin material may be detected to obtain the amount of the resin injected into the die. The force is applied to the die by the pressurizing mechanism 6 in the direction perpendicular to the die clamping direction in accordance with the stroke of the plunger 8. As a result, the balance of the pressure exerted between the inner side and the outer side of the die is held so as to restrain deformation of the die.

As deformation of the die may be restrained, the degree of contribution of the die rigidity to the control for preventing the deformation is reduced, thus decreasing the cost for the die as well as the cost for producing the injection molded product.

The deformation of the frame structure upon pressurization will be described.

Figure 8:
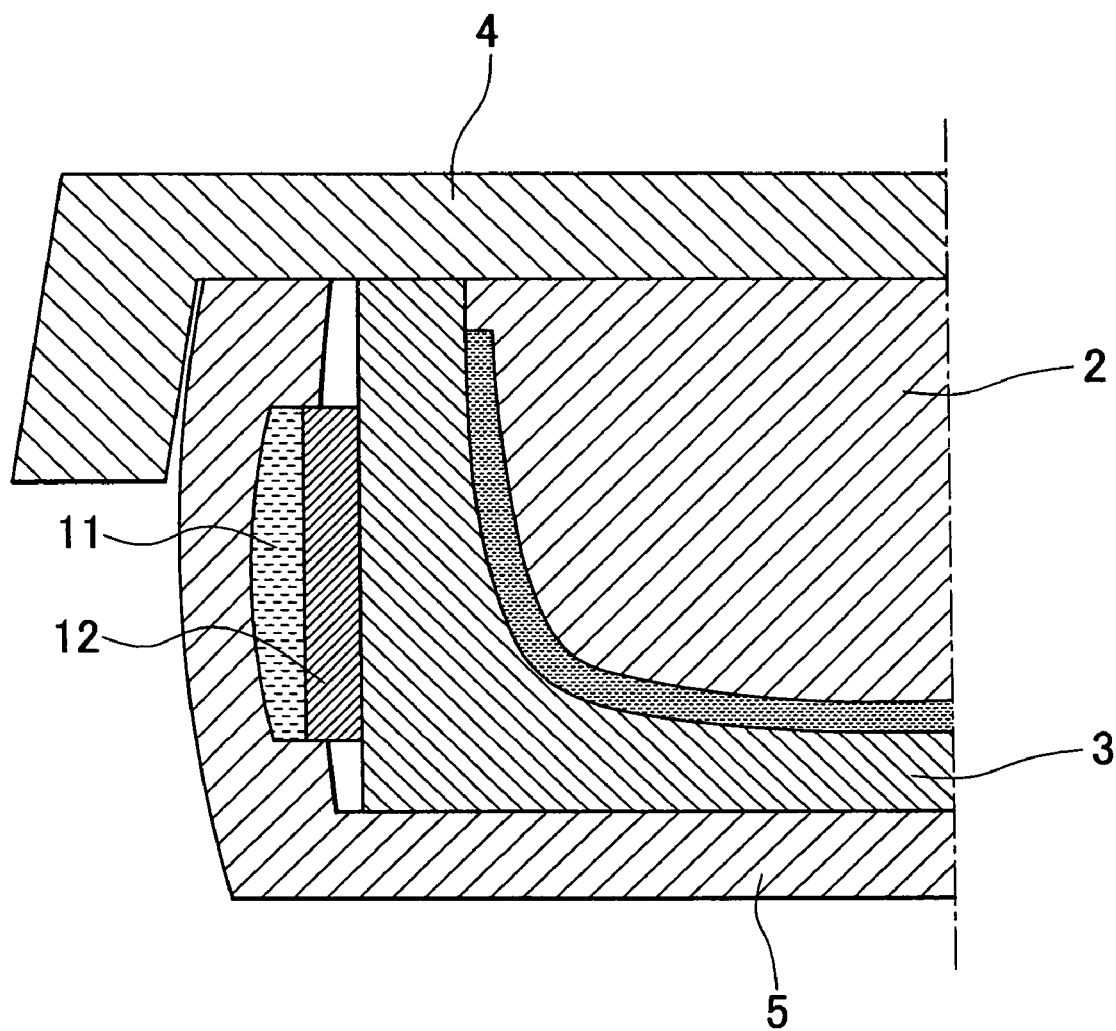
FIG. 8 is a view representing a configuration formed of the die and the frame structure upon pressurization.

FIG. 8 is a view showing the configuration of the fixed mold and the frame structure upon pressurization.

When the pressing force is generated upon supply of the work oil into the oil chamber 11, the portion of the frame 5 at which the pressurizing mechanism is disposed is bent. At the portion of the frame 5 at which the pressurizing mechanism is disposed, one side end portion is engaged with the frame 4, and the other side end portion is connected to the frame 5. The portion of the frame 5 at which the pressurizing mechanism is disposed is likely to be deformed. The portion of the frame 5 at which the pressurizing member is disposed is elastically formed so as to maintain rigidity of the die without exerting excessive force to the fixed mold 3 by the pressurizing mechanism as well as improve the molding accuracy of the injection molded product. As the pressing force may be adjusted by deformation of the frame, the frame structure is formed into a simple structure, thus reducing the manufacturing cost.

The portion of the frame 5 at which the pressurizing mechanism is disposed is made elastic. Accordingly, this makes it possible to expand the oil chamber 11 by deforming the elastic portion of the frame 5 outward while maintaining the position of the fixed mold 3 such that the pressing force through the supply of the work oil can be easily controlled.

Fixation of the frame 5 to the fixed mold 3 will be described hereinafter.

Figure 9:
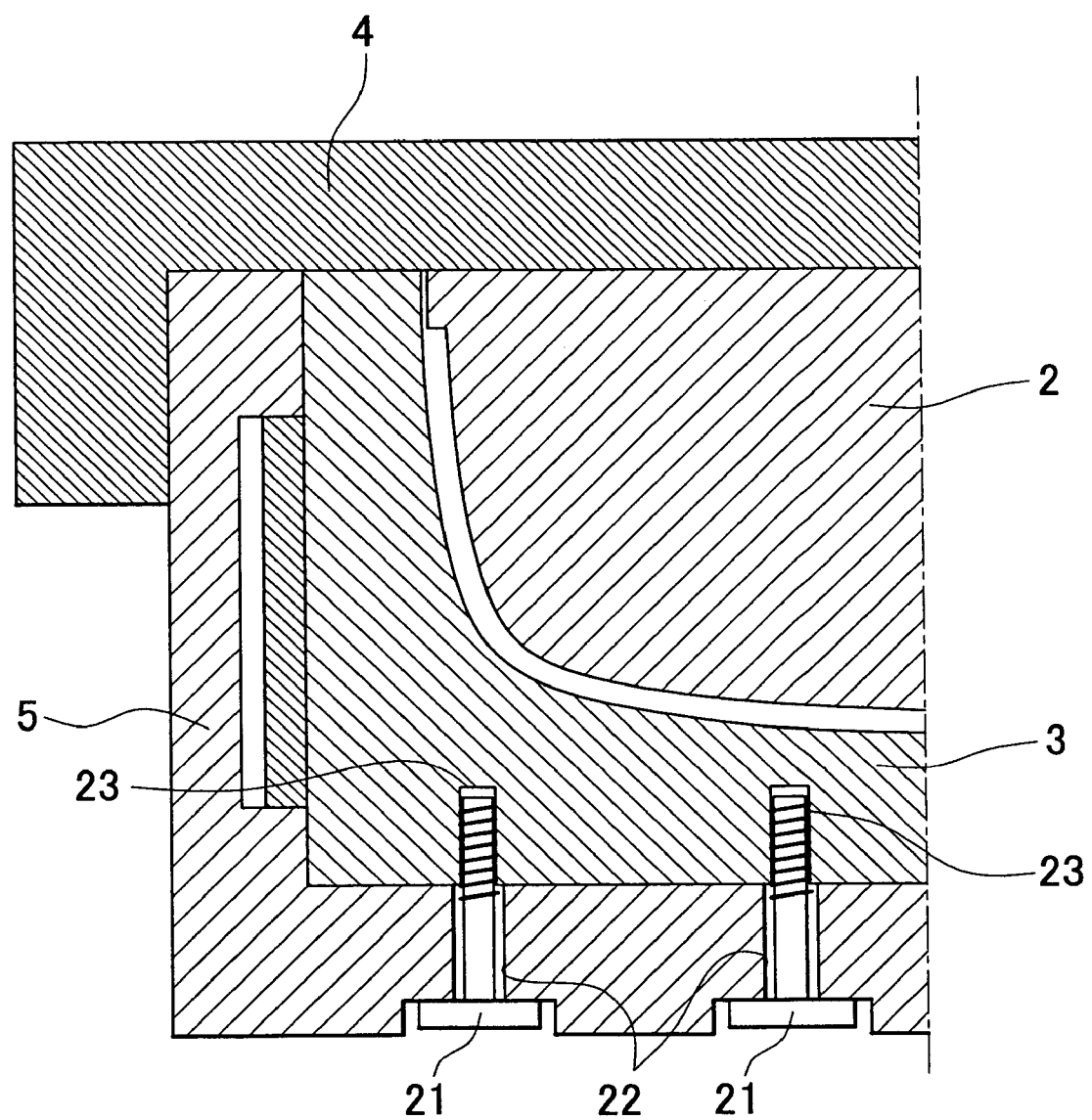
FIG. 9 is a view representing assembly of the frame structure and the fixed mold.
Figure 10:
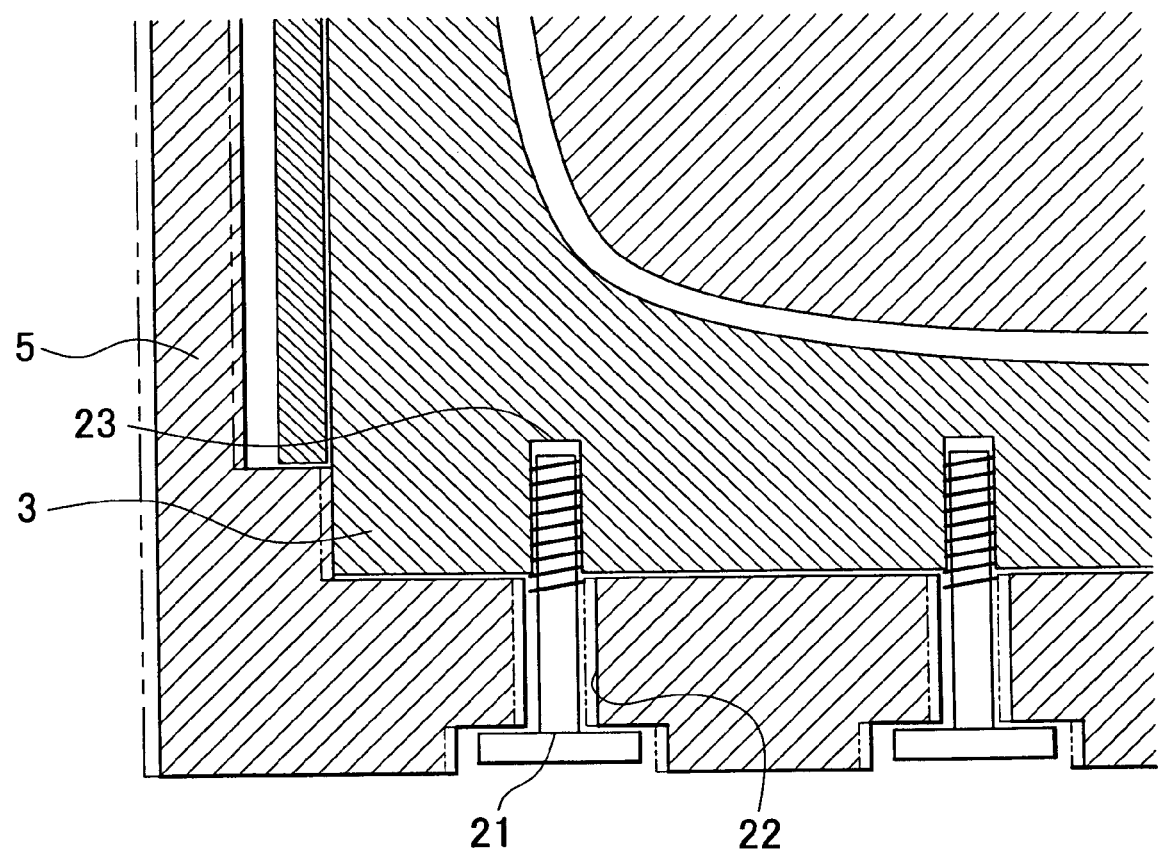
FIG. 10 is an enlarged view representing a fixed portion of the frame structure.

FIG. 9 is a view representing fixation of the frame to the fixed mold. FIG. 10 is an enlarged view of the portion at which the frame is fixed to the fixed mold.

The frame 5 is fixed to the outer surface of the fixed mold 3 in the direction perpendicular to the die clamping direction. The fixed mold 3 has holes 23 extending along the die clamping direction. Screws 21 each fit in a hole 22 formed in the frame 5 with a gap are tightened through the holes 23. The hole 22 of the frame 5 has a diameter larger than that of the screw 21 such that the head of the screw 21 is engaged with the frame 5 so as to be fixed to the fixed mold 3.

The frame 5 has an elastic portion at which the pressurizing mechanism is disposed. The portion of the frame 5 to be fixed to the fixed mold 3 extends in the direction perpendicular to the die clamping direction. That is, the portion of the frame 5 that connects the portion at which the pressurizing mechanism is disposed is extended by the reaction force upon pressurization of the pressurizing mechanism.

The diameter of the hole 22 formed in the extensible portion of the frame 5 is larger than that of the screw 21. The frame 5 is fixed to the fixed mold 3 in the direction perpendicular to the direction in which the extensible portion of the frame 5 extends. Even if the extensible portion of the frame 5 extends, fixation of the frame 5 to the fixed mold 3 may be maintained without disturbing deformation of the frame 5.

The aforementioned structured die and the frame structure that surrounds the die may restrain deformation of the fixed mold 3 caused upon injection of the resin material and prevent generation of burr during the injection molding method using elasticity of the frame 5. The pressing force may be applied to the die using the elasticity of the frame 5 that smoothly follows up the deformation of the fixed mold 3. Accordingly the pressing force can be easily controlled.

Another structure of the a pressurizing mechanism will be described.

Figure 11:
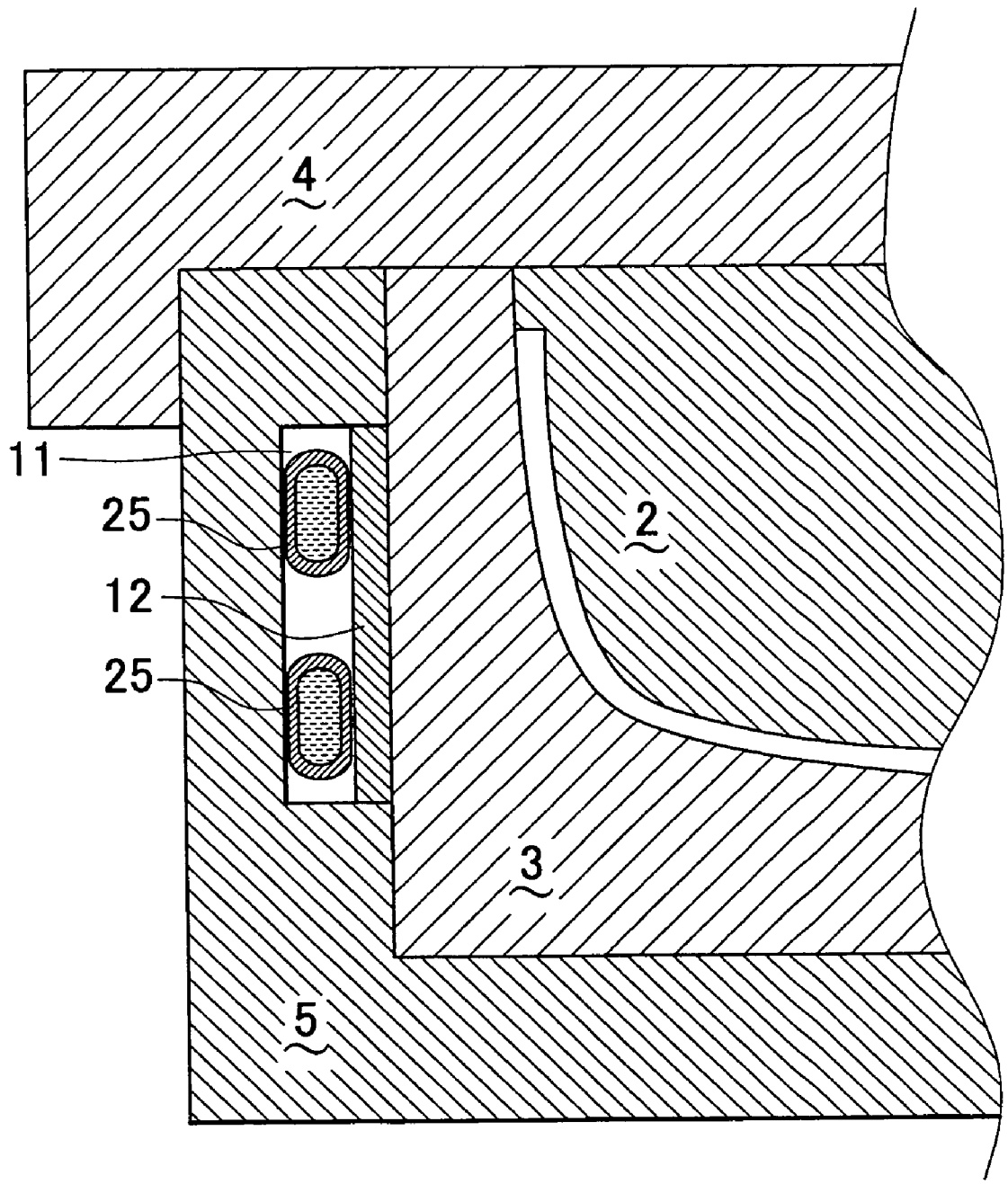
FIG. 11 is a view representing a configuration where an oil bag is used as the pressurizing mechanism.

FIG. 11 is a view that represents the pressurizing mechanism in the form of an oil-bag.

Referring to FIG. 11, the pressurizing mechanism is formed of a pressurizing plate 12 that receives the pressure applied by an oil-bag 25. The pressurizing plate 12 and the oil-bags 25, 25 are disposed within the oil chamber 11 of the frame 5. More specifically, the oil-bags 25, 25 are disposed on the inner side of the pressurizing plate 12 within the oil chamber 11. The work oil is supplied to the oil-bags 25, 25 so as to be expanded such that the pressurizing plate 12 is pressed against the fixed mold 3. This makes it possible to apply the pressing force to the fixed mold 3.

The use of the oil-bag 25 may reduce the possibility of leakage of the work oil as minimum as possible as well as improve adjustability of the pressurizing plate 12 or the frame 5.

Alternatively the pressurizing mechanism may be formed of an air-bag in place of the oil-bag depending on the state of the use of the die.

What is claimed is:

1. An injection molding apparatus comprising:
   a die having a fixed mold and a moveable mold disposed to face with each other; and
   a frame structure that abuts on an outer surface of the die, wherein
   the frame structure is formed so as to be detachable with respect to the die, and
   the frame structure is formed by combining members each engaged with each other, and the members that form the frame structure are fixed to the die in at least one direction of a die clamping direction and a direction perpendicular thereto, and wherein the frame structure is provided with a pressurizing mechanism capable of pressuring the die in the direction perpendicular to the die-clamping direction;
   wherein the pressurizing mechanism comprises a hydraulic control mechanism;
   and further wherein the hydraulic control mechanism comprises an oil chamber and a pressurizing plate that is pressed by hydraulic pressure in the oil chamber.

2. The injection molding apparatus according to claim 1, wherein a predetermined gap is formed between the member that forms the frame structure to be fixed to the die and a fixture in the direction perpendicular to the die-clamping direction.

3. The injection molding apparatus according to claim 1, wherein the hydraulic control mechanism executes a control of a pressing force in accordance with an amount of a resin material injected into the die.

4. The injection molding apparatus according to claim 1, wherein a portion of the frame structure at which the pressurizing mechanism is disposed is bent by a resin pressure.

5. An injection molding apparatus comprising:
   a die having a fixed mold and a moveable mold disposed to face with each other; and
   a frame structure that abuts on an outer surface of the die, wherein
   the frame structure is formed so as to be detachable with respect to the die, and
   the frame structure is formed by combining members each engaged with each other, and the members that form the frame structure are fixed to the die in at least one direction of a die clamping direction and a direction perpendicular thereto, and wherein the frame structure is provided with a pressurizing mechanism capable of pressuring the die in the direction perpendicular to the die-clamping direction;
   wherein the pressurizing mechanism comprises a hydraulic control mechanism;
   and further wherein the hydraulic control mechanism comprises an oil chamber, an oil-bag disposed in the oil chamber and a pressurizing plate that is pressed by hydraulic pressure in the oil bag.

6. The injection molding apparatus according to claim 5, wherein a predetermined gap is formed between the member that forms the frame structure to be fixed to the die and a fixture in the direction perpendicular to the die-clamping direction.

7. The injection molding apparatus according to claim 5, wherein the hydraulic control mechanism executes a control of a pressing force in accordance with an amount of a resin material injected into the die.

8. The injection molding apparatus according to claim 5, wherein a portion of the frame structure at which the pressurizing mechanism is disposed is bent by a resin pressure.

* * * * *